(12) United States Patent
Varotto et al.

(10) Patent No.: US 12,384,631 B2
(45) Date of Patent: Aug. 12, 2025

(54) ORIENTATION DEVICE FOR ORIENTING LOOSE PRODUCTS FOR A PACKAGING MANUFACTURING LINE AND METHOD FOR ORIENTING LOOSE PRODUCTS IN A PACKAGING MANUFACTURING LINE

(71) Applicant: Azionaria Costruzioni Macchine Automatiche A.C.M.A. S.p.A., Bologna (IT)

(72) Inventors: Mauro Varotto, Bologna (IT); Mauro Passerini, Bologna (IT); Andrea Guidetti, Bologna (IT); Marco Zecchi, Bologna (IT)

(73) Assignee: AZIONARIA COSTRUZIONI MACCHINE AUTOMATICHE A.C.M.A. S.P.A., Bologna (IT)

( * ) Notice: Subject to any disclaimer, the term of this patent is extended or adjusted under 35 U.S.C. 154(b) by 109 days.

(21) Appl. No.: 18/514,286

(22) Filed: Nov. 20, 2023

(65) Prior Publication Data
US 2024/0166453 A1    May 23, 2024

(30) Foreign Application Priority Data
Nov. 21, 2022  (IT) .......................... 102022000023931

(51) Int. Cl.
*B65G 47/244*   (2006.01)
*B65G 43/08*    (2006.01)
*B65G 47/90*    (2006.01)

(52) U.S. Cl.
CPC ........... *B65G 47/244* (2013.01); *B65G 43/08* (2013.01); *B65G 47/902* (2013.01); *B65G 2203/047* (2013.01)

(58) Field of Classification Search
CPC .... B65G 47/244; B65G 43/08; B65G 47/902; B65G 2203/047
(Continued)

(56) References Cited

U.S. PATENT DOCUMENTS

| | | | | |
|---|---|---|---|---|
| 5,823,317 A | * | 10/1998 | Bankuty | B65G 47/244 |
| | | | | 198/395 |
| 6,446,784 B1 | * | 9/2002 | Veldhuizen | B65B 23/08 |
| | | | | 198/395 |
| 7,870,943 B2 | * | 1/2011 | Malini | B65B 35/58 |
| | | | | 198/395 |

FOREIGN PATENT DOCUMENTS

| | | | | |
|---|---|---|---|---|
| DE | 102017206970 A1 | * | 10/2018 | ............. B65B 35/18 |
| EP | 1020359 A2 | | 7/2000 | |

(Continued)

*Primary Examiner* — James R Bidwell
(74) *Attorney, Agent, or Firm* — Dilworth IP, LLC

(57) ABSTRACT

An orientation device for orienting loose products for a packaging manufacturing line including a conveyor belt movable at a transport speed along an advancement direction between entry and exit stations, a plurality of gripping equipment each including a support body and a gripping head, a transport track to which the support bodies are connected, and wherein the transport track includes an active branch extending parallel to the conveyor belt, spaced from the conveyor belt and completely contained between the entry and exit stations. Each gripping head is rotatable about a rotation axis perpendicular to the conveyor belt and configured to pick up and hold a product transported by the conveyor belt. Each support body is movable parallel to the rotation axis of the respective gripping head between an approached condition and a distanced condition. Each support body moves along the active branch with a speed equal to the transport speed.

14 Claims, 8 Drawing Sheets

(58) Field of Classification Search
USPC .................................. 198/399, 401, 397.06
See application file for complete search history.

(56) References Cited

FOREIGN PATENT DOCUMENTS

| | | |
|---|---|---|
| EP | 2108604 A1 | 10/2009 |
| JP | S52 7565 A | 1/1977 |
| JP | H08 2655 A | 1/1996 |

\* cited by examiner

ORIENTATION DEVICE FOR ORIENTING LOOSE PRODUCTS FOR A PACKAGING MANUFACTURING LINE AND METHOD FOR ORIENTING LOOSE PRODUCTS IN A PACKAGING MANUFACTURING LINE

FIELD OF THE INVENTION

The present invention refers to an orientation device for orienting loose products for a packaging manufacturing line and to a method for orienting loose products in a packaging manufacturing line.

BACKGROUND

An orientation device for orienting loose products is a device acting along a product packaging manufacturing line and configured to orientate a plurality of loose products according to a predefined pattern to make them suitable to be subjected to one or more subsequent operations.

SUMMARY

The present invention is particularly directed to a device and method for orienting loose products which, during the same processing cycle, are substantially identical to each other and wherein at least one characteristic that determines a relative position with respect to a point, an axis or a reference plane is identifiable in each product.

In accordance with the present invention, a possible example of such a type of loose product is provided by food products simulating the appearance of an animal, a character, a building or the like (such as, for example, chocolates in the shape of a teddy bear, a television character, a small house and the like) which are shaped in such a way that an upper portion (e.g. the head of the teddy bear, the head of the television character, the roof of the small house) and a lower portion (e.g. the feet of the teddy bear, the feet of the television character, the base of the small house) can be identified.

The present invention is preferably directed to a device and method for orienting loose food products, such as for example chocolates, candies, chewing gums and the like, which must be spatially oriented according to predetermined orientations in order to be able to properly feed them to a wrapping device which over-wraps the food product.

In the Applicant's experience, the operation of orientation of the products can be performed by an orientation device comprising a conveyor belt on which products arranged between them in a row and spaced apart from each other are placed. The conveyor belt is provided with a plurality of septa equally spaced from each other, parallel and arranged perpendicularly to the advancement direction of the conveyor belt, wherein a respective pocket or housing seat is defined between two adjacent septa. One or more pairs of pushers are placed in front of these septa, move integrally with the conveyor belt and are operable in approach to the septa. Each pusher of a pair of pushers is aligned with a respective pocket. The loose products are transported by the conveyor belt aligned (along a direction perpendicular to the transport direction) to the septa and to the pushers. One or more video cameras identify the orientation of each product. Depending on the identified orientation of a product, either one or the other of the pushers of a pair of pushers is activated, which pushes the product towards a pocket defined between two septa. The product thus pushed interferes with a septum that acts as a fulcrum, resulting in a substantially 90° rotation of the product and its insertion into the respective pocket. For example, if all products are to be oriented with the respective lower portions directed towards the bottom of the pockets, when a product is initially oriented with the lower portion in the advancement direction of the conveyor belt, the pusher further downstream of the pair of pushers is activated, so that the product is inserted into the respective pocket with the lower portion directed towards the bottom of the pocket. When a product is initially oriented with the lower portion facing away from the advancement direction of the conveyor belt, the pusher further upstream of the pair of pushers is activated, so that the product is inserted into the respective pocket with the lower portion directed towards the bottom of the pocket. The products thus oriented are transported between them arranged parallel in the pockets of the conveyor belt and oriented in the same way (for example with the lower portion directed towards the bottom of the pocket) as far as an exit station.

The Applicant has noted that such a type of orientation device for orienting products may have large dimensions that increase the space required for setting up the manufacturing line.

In fact, in the Applicant's experience, in the modern manufacturing lines the production rate of the wrapping devices (i.e. the number of products that can be wrapped in the unit of time) is very high. In order to be able to feed a large number of correctly oriented products to the wrapping device in the unit of time, it is therefore necessary to set the conveyor belt of the orientation device with high advancement speeds.

However, the Applicant has noted that the pushers of the wrapping device must be operated with slow movements and therefore move towards the products (in order to be able to push them towards the septa) with relatively low speeds to avoid subjecting the products to too violent shocks and collisions. This is to prevent the products from being damaged or altered by a too violent contact against the pushers and the septa.

Since each pair of pushers must translate at the same speed as the conveyor belt in order to be able to "chase" the loose product to be oriented, the length of the conveyor belt and thus of the orientation device is given by the product of the advancement speed of the conveyor belt and the time required to orient a product.

The Applicant has verified that in some applications in which the device placed downstream of the orientation device has high production rates, the correlated transport speed of the conveyor belt of the orientation device and the relatively high time required to orient the products may result in a very long length of the conveyor belt with a consequent large space required for setting up the manufacturing line.

The Applicant has therefore felt the need to have an orientation device and a method for orienting products that allow the products to be correctly oriented in limited spaces.

The Applicant has perceived that in order to decrease the dimensions of the orientation device, the time needed to orient each product could be decreased while the product is being transported by the conveyor belt.

The Applicant has also perceived that by avoiding subjecting the product to be oriented to impacts and collisions, the time necessary to orient each product would not be affected by the necessary slowness of movements to prevent damages to the product.

The Applicant has found that by picking up the product to be oriented from the conveyor belt, orienting the product while it is being picked up and while it is being transported at the same speed as the conveyor belt and depositing the product onto the conveyor belt once correctly oriented, it would be possible to avoid subjecting the product to be oriented to impacts and creeps and it would therefore be possible to decrease the time necessary to orient each product.

The present invention therefore concerns, in a first aspect thereof, an orientation device for orienting loose products for a packaging manufacturing lines.

Preferably, there is provided a conveyor belt movable at a transport speed along an advancement direction between an entry station and an exit station.

Preferably, there is provided a plurality of gripping equipment wherein each gripping equipment comprises a support body and a gripping head mechanically connected to the support body.

Preferably, there is provided a transport track to which the support bodies of the plurality of gripping equipment are connected and wherein the transport track comprises an active branch extending parallel to the conveyor belt.

Preferably, there is provided a frame which supports the transport track.

Preferably, the active branch extends spaced from the conveyor belt.

Preferably, the active branch is completely contained between the entry station and the exit station of the conveyor belt.

Preferably, each gripping head is rotatable about a rotation axis perpendicular to the conveyor belt and is configured to pick up and hold a product transported on the conveyor belt.

Preferably, each support body is movable parallel to the rotation axis of the respective gripping head between an approached condition to the conveyor belt and a distanced condition from the conveyor belt.

Preferably, each support body moves along the active branch of the transport track with a speed equal to the transport speed of the conveyor belt.

Preferably, there is provided an orientation detector operatively active on the conveyor belt configured to generate at least a first orientation signal representative of an incorrect orientation of a product transported on the conveyor belt.

The Applicant believes that by lowering the support body of a gripping equipment on a product not correctly oriented by the conveyor belt in such a way that the gripping head can pick up and hold said product, it is possible to rotate the gripping head while it holds the picked up product and thus to correctly orient the picked up product. By orienting the product through a rotation of the gripping head, the product is not subjected to impacts or collisions regardless of the angular speed of the gripping head, minimizing the time needed to correctly orient the product. Furthermore, by moving the gripping equipment along the transport track at the same speed as the conveyor belt and by arranging this transport track parallel to the conveyor belt, it is possible to deposit the picked up and rotated product in the same position on the conveyor belt from which it has been taken.

In a second aspect thereof, the present invention concerns a method for orienting loose products in a packaging manufacturing line.

Preferably, it is provided to feed products arranged in a single row to a conveyor belt.

Preferably, it is provided to advance the conveyor belt at a transport speed.

Preferably, it is provided to arrange a plurality of gripping equipment, to lower a gripping equipment onto a product transported by the conveyor belt only if said product (P) is not correctly oriented and to hold said product with a gripping head of the gripping equipment.

Preferably, it is provided to rotate the gripping head while the product is held by the gripping head and while the gripping equipment moves parallel to the conveyor belt and at the same speed as the conveyor belt.

Preferably, it is provided to release the rotated product onto the conveyor belt. In the present description and in the appended claims, "orientation" of a product means the laying direction of an identifiable portion of said product with respect to the advancement direction of the conveyor belt. For example, a product may have an orientation with the lower portion directed along the advancement direction of the conveyor belt. In this case, the lower portion of the product precedes the upper portion of the product along the advancement direction of the conveyor belt. A product having an orientation with the upper portion directed along the advancement direction of the conveyor belt has the upper portion of the product preceding the lower portion of the product along the advancement direction of the conveyor belt.

In the present description and in the appended claims, the expressions "upstream" and "downstream" refer to the advancement direction of the conveyor belt. An upstream position precedes a downstream position along a direction coincident with or parallel to the advancement direction of the conveyor belt.

The present invention may have, in both aspects discussed above, at least one of the preferred features described below. Such features may thus be present individually or in combination with each other, unless expressly stated otherwise, both in the device of the first aspect of the present invention and in the method of the second aspect of the present invention.

Preferably, the support frame further supports the conveyor belt.

Preferably, the transport track is closed like a loop and comprises a return branch connected to the active branch.

Preferably, the gripping equipment move along the transport track by cyclically travelling along the active branch and the return branch.

Preferably, the active branch of the transport track is comprised between the point in which the support body of each gripping equipment starts a movement to move into the approached condition and the point in which the support body of each gripping equipment starts a movement to move into the distanced condition.

Preferably, the gripping equipment are transported along the transport track by a belt or by a chain that follows the path of the transport track.

Preferably, the gripping equipment are mounted integral with the belt or with the chain and the chain or the belt are operated in such a way as to transport the gripping equipment at constant speed along the transport track.

Preferably, the conveyor belt is closed like a loop on a pair of pulleys.

Preferably, the conveyor belt is positioned below the active branch of the transport track.

Preferably, the conveyor belt comprises an entry end for the products and an exit end for the products.

Preferably, the entry end is placed upstream of the exit end and the conveyor belt extends continuously along a rectilinear direction between the entry end and the exit end.

Preferably, the products are fed onto the conveyor belt while the conveyor belt moves at a transport speed.

Preferably, the motion of the conveyor belt is a continuous motion with no interruptions.

Preferably, the transport speed of the conveyor belt is constant.

Preferably, the products are fed to the conveyor belt arranged along a single row.

Preferably, the products fed to the conveyor belt are identical to each other.

Preferably, feeding products to the conveyor belt arranged in a single row comprises feeding the products to the conveyor belt spaced apart by equal distances or integer multiples of a predetermined product distance.

Preferably, a lower portion and an upper portion are identifiable in each product.

Preferably, the lower portion of a product is identical to the lower portion of all other products.

Preferably, the upper portion of a product is identical to the lower portion of all other products.

Preferably, the products are randomly fed to the conveyor belt according to only two possible orientations.

By way of example, the products may be randomly fed to the conveyor belt with a lower portion preceding along the advancement direction the upper portion or with the upper portion preceding the lower portion.

Alternatively, the products may for example be randomly fed to the conveyor belt with a lower portion placed above, along a direction perpendicular to the advancement direction, the upper portion or with the upper portion placed above the lower portion.

Alternatively, the products may for example be randomly fed to the conveyor belt with a lower portion placed above, along a direction perpendicular to the advancement direction, the upper portion or with the upper portion preceding along the advancement direction the lower portion.

Alternatively, the products may for example be randomly fed to the conveyor belt with an upper portion placed above, along a direction perpendicular to the advancement direction, the lower portion or with the upper portion preceding along the advancement direction the lower portion.

Alternatively, the products may for example be randomly fed to the conveyor belt with a lower portion placed above, along a direction perpendicular to the advancement direction, the upper portion or with the lower portion preceding along the advancement direction the upper portion.

Alternatively, the products may for example be randomly fed to the conveyor belt with an upper portion placed above, along a direction perpendicular to the advancement direction, the lower portion or with the lower portion preceding along the advancement direction the upper portion.

Preferably, the products are fed to the conveyor belt in such a way that for each transported product there is a gripping equipment available.

Preferably, the distance along the advancement direction separating one gripping equipment from a following gripping equipment is equal to said predetermined product distance.

Preferably, each gripping equipment is placed aligned above a respective product.

Preferably, the conveyor belt comprises a plurality of groups of suction holes.

Preferably, the groups of suction holes are equally spaced from each other.

Preferably, the distance along the advancement direction between two groups of suction holes is equal to the distance along the advancement direction between two adjacent gripping equipment.

Preferably, each group of suction holes is spaced along the advancement direction from another group of suction holes by a distance equal to said predetermined product distance.

Preferably, each group of suction holes is configured to hold a respective product on the conveyor belt.

Preferably, it is provided to detect the orientation of the transported product to determine whether the transported product is not correctly oriented.

Preferably, it is also provided to detect the orientation of the transported product to determine whether the transported product is correctly oriented.

Preferably, detecting the orientation of the transported product precedes lowering a gripping equipment onto a product transported by the conveyor belt.

Preferably, lowering a gripping equipment on a product transported by the conveyor belt is actuated only if the transported product is not correctly oriented.

Preferably, the orientation detector is placed at the entry end of the conveyor belt.

Preferably, the orientation detector is configured to generate a second orientation signal.

Preferably, said second orientation signal is representative of a correct orientation of a product transported on the conveyor belt.

Preferably, detecting the orientation of the transported product comprises acquiring an image of the transported product and comparing the acquired image with a reference image.

Preferably, an image is acquired for each product transported by the conveyor belt.

Preferably, said reference image is representative of a correctly oriented product.

Preferably, the orientation detector comprises a video camera or a camera for acquiring an image of the transported product.

Preferably, the orientation detector comprises a processor for comparing the acquired image with a reference image.

Preferably, the processor is configured to generate said first orientation signal when the acquired image does not correspond to the reference image.

Preferably, the processor is configured to generate said second orientation signal when the acquired image corresponds to the reference image.

Preferably, there is provided a first switching device configured to switch the support body of a respective gripping equipment from the distanced condition to the approached condition only if the orientation detector generates said first orientation signal.

Preferably, the first switching device is configured not to switch the support body of a respective gripping equipment from the distanced condition to the approached condition when the orientation detector generates said second orientation signal.

Preferably, each support body of the gripping equipment comprises a fluid-operated piston for moving between the distanced condition and the approached condition.

Preferably, each head of the gripping equipment comprises a gripping handpiece configured to contact and hold a product transported by the conveyor belt.

Preferably, said gripping head further comprises a fluid-operated lifter for said gripping handpiece configured to distance said gripping handpiece from said conveyor belt.

The Applicant has verified that by providing a fluid-operated piston for each support body and a fluid-operated lifter for each gripping handpiece, it is possible to avoid using electrical components or actuators to switch the support bodies between the distanced condition and the approached condition and to pick up and lift the products from the conveyor belt.

The Applicant has found that in this way it is possible to avoid complex power supply systems configured to actuate regardless of each other the support bodies and the gripping handpieces. In the Applicant's experience, in fact, in order to electrically power a plurality of electrical actuators mounted on gripping equipment constantly moving along a closed-loop path it would be necessary to provide dedicated electrical connections for each gripping equipment and ensure that such electrical connections are able to reach the gripping equipment regardless of their position along the transport track. Such an electrical connection diagram would be complex, expensive and cumbersome.

By providing a fluid-operated piston for each support body and a fluid-operated lifter for each gripping handpiece, it is possible to fluidly connect all the gripping equipment in series with each other and feed all the support bodies and the gripping heads with a single pressurized fluid source, minimizing the complexity and the overall dimensions of the feed system.

Preferably, each gripping equipment comprises a pressurized fluid distributor selectively placed in fluid connection with said fluid-operated piston and with said fluid-operated lifter.

Preferably, there is provided a pressurized fluid source.

Preferably, all the gripping equipment are fluidly connected to each other in series and at least one gripping equipment is connected to said pressurized fluid source.

Preferably, in order to fluidly connect all the gripping equipment in series, each pressurized fluid distributor comprises an entry and an exit in permanent fluid connection. The exit of a pressurized fluid distributor is connected to the entry of the pressurized fluid distributor of the adjacent gripping equipment and the entry of at least one pressurized fluid distributor is in fluid connection with the pressurized fluid source.

Preferably, each support body of the gripping equipment comprises a return spring for moving between the approached condition and the distanced condition.

Preferably, said gripping handpiece is slidably mounted on the gripping head.

Preferably, the gripping handpiece contacts a product to be lifted when the support body has not yet fully switched into the approached condition.

Preferably, the support body reaches the approached condition after the gripping handpiece has contacted the product to be lifted.

Preferably, the gripping handpiece translates in the opposite direction to the movement of the support body when the support body reaches the approached condition and lifts the contacted product from the conveyor belt.

Preferably, the gripping handpiece is distanced from the conveyor belt when the support body reaches the approached condition and when the fluid-operated lifter is activated.

Preferably, when the fluid-operated lifter is activated, the gripping handpiece translates with respect to the gripping head due to a suction action actuated by the fluid-operated lifter.

Preferably, the first switching device comprises an actuation valve switchable between an open position in which it puts a pressurized fluid source in fluid communication with said fluid-operated piston and with said fluid-operated lifter and a closed position in which it interrupts a fluid communication between said pressurized fluid source, said fluid-operated piston and said fluid-operated lifter.

Preferably, said actuation valve is selectively placed in fluid communication with said pressurized fluid distributor and is configured to put said fluid-operated piston and said fluid-operated lifter in communication with the pressurized fluid distributor and to interrupt the fluid communication between said pressurized fluid distributor and said fluid-operated piston and said fluid-operated lifter.

Preferably, there is provided an actuation valve for each gripping equipment.

Preferably, each actuation valve is mounted on a respective gripping equipment.

Preferably, said first switching device further comprises a mechanical pusher for switching said actuation valve between the closed position and the open position.

Preferably, said mechanical pusher does not act directly on said actuation valve.

Preferably, there is provided a mechanical pusher for each gripping equipment.

Preferably, each mechanical pusher is mounted on a respective gripping equipment.

Preferably, said first switching device comprises a pilot valve on which said mechanical pusher acts.

Preferably, said mechanical pusher is configured to switch said pilot valve between a closed position and an open position.

Preferably, in the open position, the pilot valve sends pressurized fluid to said actuation valve to switch it from the closed position to the open position.

Preferably, in the closed position, the pilot valve does not send pressurized fluid to said actuation valve and switches it from the open position to the closed position.

Preferably, there is provided a pilot valve for each gripping equipment.

Preferably, each pilot valve is mounted on a respective gripping equipment.

Preferably, said first switching device comprises an electromagnet for activating said mechanical pusher.

Preferably, said first switching device comprises a single electromagnet operating on all the mechanical pushers.

Preferably, said electromagnet is fixedly mounted on said frame.

Preferably, said electromagnet is activated when the orientation detector generates said first orientation signal.

Preferably, said electromagnet is not activated when the orientation detector generates said second orientation signal.

Preferably, the electromagnet is energized only when the orientation detector generates said first orientation signal.

Preferably, the first switching device comprises a ferromagnetic body for each gripping equipment configured to transit in front of the electromagnet during the movement of the gripping equipment along the transport track.

Preferably, when the electromagnet is activated, the ferromagnetic body is magnetically attracted towards the electromagnet and performs an activation movement that brings the mechanical pusher into an activation position.

Preferably, when the electromagnet is not activated, the ferromagnetic body is not magnetically attracted towards the electromagnet and does not perform any activation movement remaining in an inactive position and preventing the activation of the mechanical pusher.

Preferably, when the orientation detector generates said first orientation signal, the electromagnet is activated only for the time necessary to activate the mechanical pusher.

Preferably, when the orientation detector generates said first orientation signal, the electromagnet is activated only for the time necessary to magnetically attract the ferromagnetic body.

Preferably, there is provided a second switching device configured to switch the support body of a respective gripping equipment from the approached condition to the distanced condition.

Preferably, said second switching device is placed downstream of the electromagnet.

Preferably, said second switching device is active only on the support bodies placed in the approached condition by the first switching device.

Preferably, there is provided only a second operating switching device on all the support bodies.

Preferably, said second switching device is fixedly mounted on said frame.

Preferably, the second switching device acts, preferably indirectly, on the mechanical pusher to switch the respective actuation valve between the open position and the closed position.

Preferably, the second switching device acts, preferably indirectly, on the mechanical pusher to switch said pilot valve between the open position and the closed position.

Preferably, in the closed position, the pilot valve does not send pressurized fluid to said actuation valve and switches it from the open position to the closed position.

Preferably, the actuation valve, in the closed position interrupts the fluid communication with the fluid-operated piston with the fluid-operated lifter.

Preferably, when the fluid communication between the actuation valve, the fluid-operated piston and the fluid-operated lifter is interrupted, the support body is switched from the approached condition to the distanced condition and the fluid-operated lifter interrupts its action on the gripping handpiece.

Preferably, the support body is switched from the approached condition to the distanced condition under the action of said return spring.

When the fluid-operated lifter interrupts its action on the gripping handpiece, the gripping handpiece translates towards the conveyor belt and lowers the product onto the conveyor belt.

Preferably, the gripping handpiece translates with respect to the gripping head due to the interruption of the suction action actuated by the fluid-operated lifter.

Preferably, the gripping handpiece is distanced from the conveyor belt when the support body reaches the distanced condition.

Preferably, releasing the product picked up from the conveyor belt comprises releasing the product on the same portion of the conveyor belt from which it was taken.

Preferably, the second switching device is configured to allow the ferromagnetic body, which previously performed the activation movement, to be shifted to the inactive position.

Preferably, the second switching device comprises a chute fixed to the frame configured to switch only the ferromagnetic bodies that have previously performed the activation movement.

Preferably, the gripping head and the support body are rotationally constrained to each other about the rotation axis of the gripping head.

Preferably, the gripping head rotates about the rotation axis regardless of the movement of the support body between the distanced condition and the approached condition.

Preferably, the gripping head rotates during the movement of the respective gripping equipment along the active branch of the transport track.

Preferably, the gripping head rotates during the movement of the respective gripping equipment along a gripping portion of the active branch of the transport track.

Preferably, the gripping portion of the active branch of the transport track is comprised between the point, along the active branch of the transport track, in which the gripping heads contact the product to be correctly oriented and the point in which the gripping heads release the oriented product.

Preferably, the gripping head rotates during the movement of the respective gripping equipment along the gripping portion of the active branch of the transport track both in the case where the orientation detector generates the first orientation signal and in the case where the orientation detector does not generate the first orientation signal.

Preferably, all the gripping heads rotate about the rotation axis by a same first angular amount and in a same first angular direction during the movement of the respective gripping equipment along the active branch of the transport track.

Preferably, all the gripping heads rotate about the rotation axis by a same second angular amount and in a same second angular direction during the movement of the respective gripping equipment along the return branch of the transport track.

Preferably, said first angular amount is equal to said second angular amount and said first angular direction is opposite to said second angular direction.

Preferably, said first angular amount is an angle comprised between 90° and 180°, more preferably of about 180°.

Preferably, there is provided a cam connected to said active section of the transport track.

Preferably, each gripping equipment comprises a follower engaged on said cam.

Preferably, said follower imposes a rotation around the rotation axis of the gripping head of the respective gripping equipment during the travel of said cam.

Preferably, said follower imposes a rotation around the rotation axis of the gripping head equal to said first angular amount and in the first angular direction during the travel of said cam.

Preferably, said cam is placed downstream of said electromagnet.

Preferably, said cam is configured to put said gripping head in rotation after the support body is switched into the approached condition.

Preferably, said cam is configured to interrupt the rotation of said gripping head before the support body is switched from the approached condition to the distanced condition.

Preferably, there is provided a further cam connected to said return section of the transport track.

Preferably, said further cam and said cam are made from a single cam path.

Preferably, the follower of each gripping equipment is engaged on said further cam.

Preferably, said follower imposes a rotation around the rotation axis of the gripping head of the respective gripping equipment during the travel of said further cam.

Preferably, said follower imposes a rotation around the rotation axis of the gripping head equal to said second angular amount and in the second angular direction during the travel of said further cam.

Preferably, each gripping equipment comprises a gear wheel keyed to the support body.

Preferably, the gear wheel is engaged by a rack controlled in rotation by said follower.

BRIEF DESCRIPTION OF THE DRAWINGS

Further characteristics and advantages of the present invention will become clearer from the following detailed description of a preferred embodiment thereof, with reference to the appended drawings and provided by way of indicative and non-limiting example, wherein.

DETAILED DESCRIPTION

Figure 1:
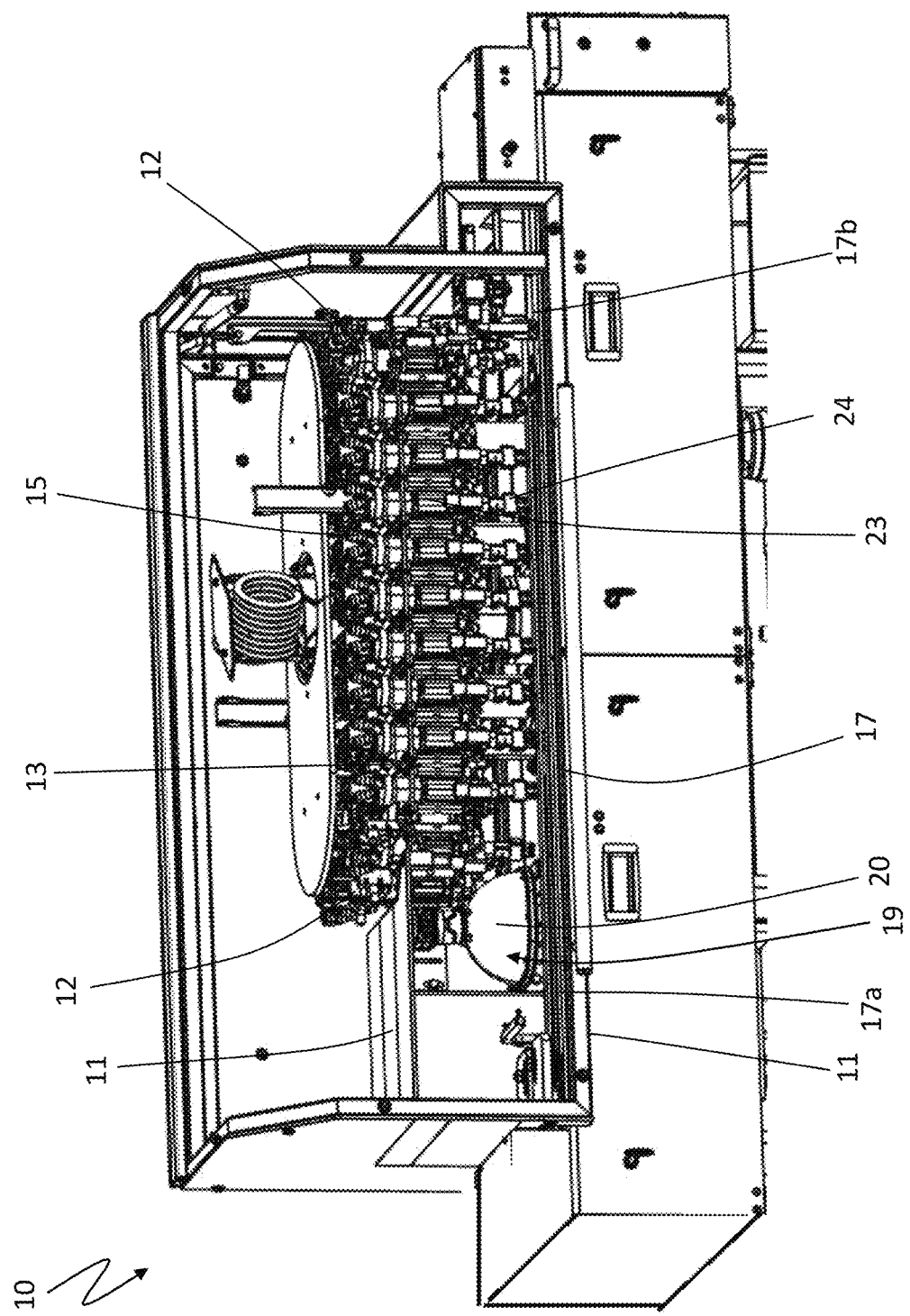
FIG. 1 is a schematic perspective view of an orientation device for orienting loose products for a packaging manufacturing line in accordance with the present invention.

An orientation device for orienting loose products for a packaging manufacturing line in accordance with the present invention has been indicated with reference numeral 10 in FIG. 1.

The device 10 comprises a frame 11 on which the various components of the device 10 are mounted.

Figure 2:
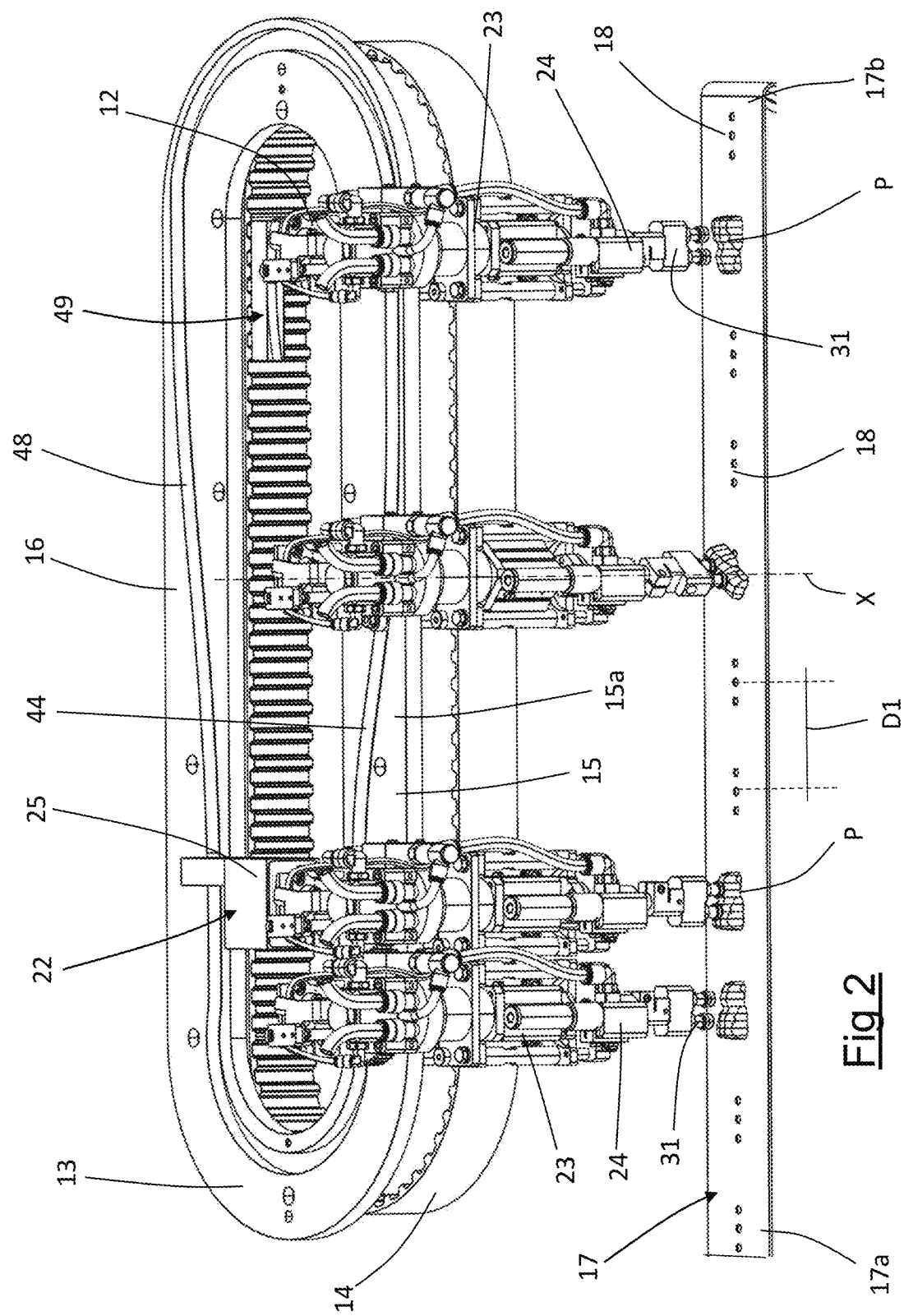
FIG. 2 is a schematic perspective view of some details of the orientation device of FIG. 1.

The device 10 comprises a plurality of gripping equipment 12 movable along a transport path 13 (better illustrated in FIG. 2). The gripping equipment are equally spaced from each other along the transport track 13. The gripping equipment 12 are set in motion along the transport path by a closed-loop and motorized belt 14. The transport equipment 12 are integral with the belt 14 and transported by the same.

The transport path 13 comprises an active branch 15 and a return branch 16. The gripping equipment 12 cyclically travel along the active branch 15 and the return branch 16 of the transport track 13 at a predetermined and constant transport speed.

The transport track 13 is mounted integral with the frame 11. A conveyor belt 17 closed on itself and placed below the active branch 15 of the transport track 13 is also mounted on the frame 11. The conveyor belt 17 comprises an entry station 17a for products P and an exit station 17b for the same products P. The conveyor belt 17 advances at a constant transport speed along an advancement direction (directed from left to right in FIG. 2) and equal to the transport speed of the gripping equipment 12 along the transport track 13.

As better depicted in FIG. 2 (where for convenience of representation only some transport equipment 12 have been illustrated), the conveyor belt 17 comprises a plurality of groups of suction holes 18. Each group of suction holes 18 is spaced from the preceding and the following group of suction holes 18 by a product distance D1 along the advancement direction. This product distance D1 is also the distance separating a transport equipment 12 from the preceding and the following one along the transport track 13. The groups of suction holes have the function of holding the products P on the conveyor belt 17 while they are being transported by the latter. The products P (depicted in FIG. 2) are transported by the conveyor belt 17 at the same transport speed as the latter.

In particular, the products P are placed on the conveyor belt 17 in a single row and spaced apart by distances equal to or multiple of the product distance D1. Each product P is placed on the conveyor belt 17 at a group of suction holes 18. Each transport equipment 12, when travelling along the active branch 15 of the transport path 13, is placed on the vertical of a group of suction holes 18, i.e. its projection on the conveyor belt 17 passes through a group of suction holes 18. The active branch 15 of the transport path 13 is completely arranged between the entry station 17a and the exit station 17b of the conveyor belt 17. In other words, the gripping equipment 12 act on the single conveyor belt 17 of the device 10.

The products P are placed on the conveyor belt 17 (for example coming from a conveyor not illustrated placed upstream of the conveyor belt 17) according to a random orientation given by two possible orientations. In one example, to which reference will be made, the products P are placed on the conveyor belt 17 oriented with a lower portion preceding an upper portion or with an upper portion preceding a lower portion.

The device 10 comprises an orientation detector 19 (illustrated in FIG. 1) placed downstream of the entry station 17a of the conveyor belt 17.

The orientation detector 19 checks in sequence on each product P placed on the conveyor belt 17 and has the function of determining whether the checked product is incorrectly oriented.

The orientation detector 19 comprises a video camera 20 or a camera for acquiring an image of the product P. The video camera 20 is placed downstream of the entry station 17a of the conveyor belt 17 (FIG. 1).

The video camera 20 sends the acquired image of the product P to a processor 21 which compares the acquired image with a reference image previously sent to the processor 21.

The reference image is an image of what a correctly oriented product P should look like on the conveyor belt 17. Since all the products P sent to the conveyor belt 17 are identical to each other, when the processor 21 determines that the acquired image differs from the reference image, then the product P to which the acquired image corresponds is certainly not correctly oriented.

The processor 21 is configured to generate a first orientation signal SO1 when the acquired image does not correspond to the reference image.

This first orientation signal SO1 is used to activate a corresponding gripping equipment 12 that operates on the product P to correctly orient it.

In some embodiments, the processor 21 is further configured to generate a second orientation signal SO2 when the acquired image coincides with the reference image.

The device 10 comprises a first switching device 22 configured to operate the transport equipment 12 which is vertically aligned with the product P to be correctly oriented and which moves along the active branch 15 of the transport path 13 at the same transport speed as the conveyor belt 17 and therefore as the product P to be correctly oriented.

The first switching device 22 is activated by the processor 21 which sends the first orientation signal SO1 to the first switching device 22.

In order to be able to correctly orient a product P, each gripping equipment comprises a support body 23 and a gripping head 24.

The support body 23 is transported by the belt 14 along the transport track 13 and is movable, when it travels along the active branch 15 of the transport track 13, between a distanced condition and an approached condition to the conveyor belt 17.

The gripping head 24 is integral with the support body 23 during the movement of the latter along the transport track 13 and is operated to move towards and away from the conveyor belt 17 by the support body 23.

In the distanced condition of the support body 23, the gripping head is distanced from the conveyor belt 17 and in the approached condition of the support body 13 the gripping head is approached to the conveyor belt 17. When the support body 23 is in the approached condition, the gripping head 24 is able to contact and lift a corresponding product P from the conveyor belt 17.

The gripping head 24 is also rotatable about a rotation axis X perpendicular to the conveyor belt 17 in order to be able to rotate and correctly orientate a picked up product not correctly oriented.

The gripping head 24 is slidably coupled to the respective support body 23 along a direction parallel to the rotation axis X.

Upon receipt of the first orientation signal SO1, the first switching device 22 is configured to allow to the support body 23, of the gripping equipment 12 which is placed vertically aligned with the product P not correctly oriented, to pass from the distanced condition to the approached condition.

Each support body 23 of the gripping equipment 12 comprises a fluid-operated piston 29 for moving between the distanced condition and the approached condition by translating the gripping head 24 with respect to the support body 23 in approach to the conveyor belt 17.

Figure 3:
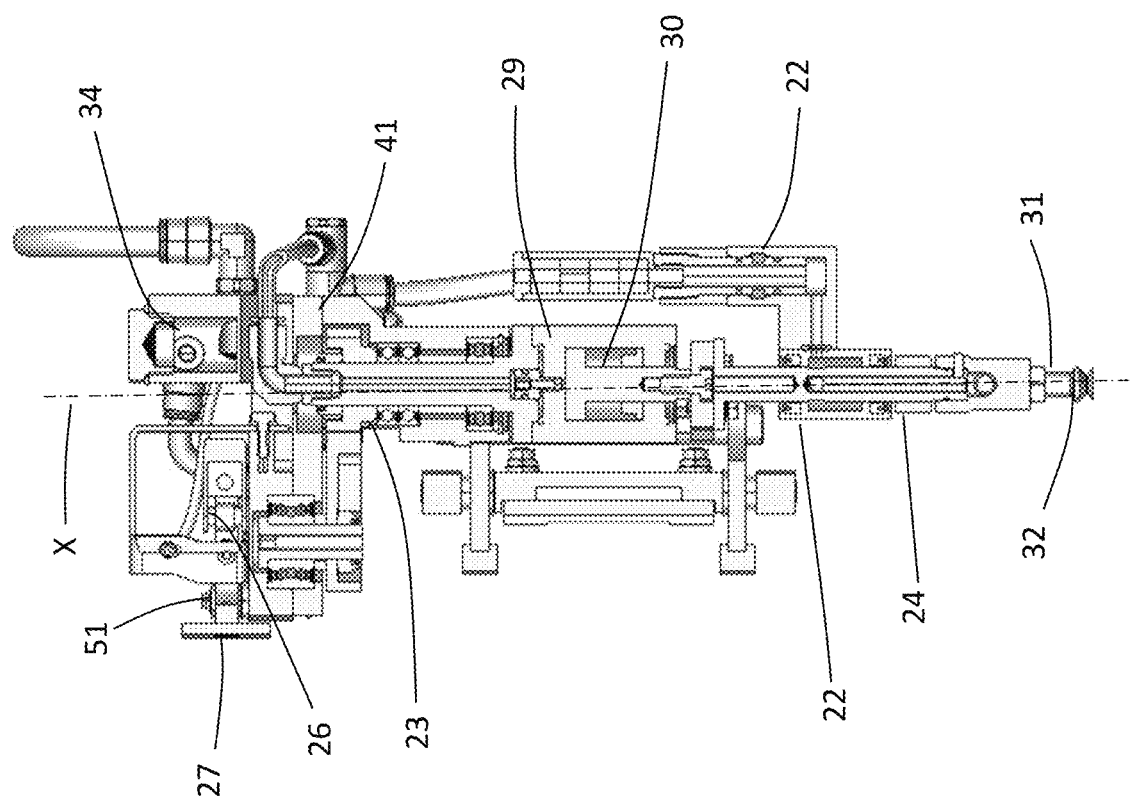
FIG. 3 is a sectional view of a gripping equipment of the device of FIG. 2.

As depicted in the section of FIG. 3, the fluid-operated piston 29 pushes the gripping head 24 in contrast to a return spring 30 towards the conveyor belt 17.

In the preferred embodiment of the invention, the fluid-operated piston 29 is a pneumatic piston.

Each gripping head 24 comprises a gripping handpiece 31 configured to contact and hold a product P.

Figure 6:
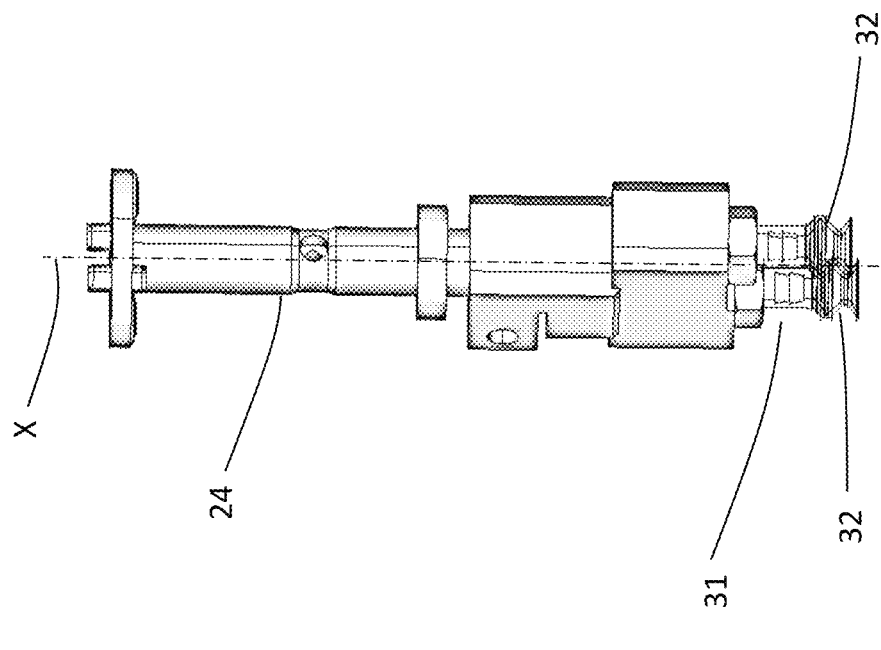
FIG. 6 is a schematic perspective view of a gripping head of the gripping equipment of FIG. 4.

The gripping handpiece 31 is made of deformable material, for example rubber, and is fitted to a lower end of the gripping head 24, as shown in FIG. 6.

When the gripping hand 31 contacts a product P transported by the conveyor belt 17, the gripping hand 31 is slightly compressed fluid-tightly adhering on the product P.

In the preferred embodiment of the invention, the gripping handpiece 31 comprises two teats 32.

The gripping head 24 further comprises a fluid-operated lifter 33 active on the gripping handpiece 31 and in fluid connection with the gripping handpiece 31.

The fluid-operated lifter 33 creates a depression within the gripping handpiece 31 to allow the gripping handpiece 31 to hold the contacted product P. The depression created by the fluid-operated lifter 33 further deforms the gripping handpiece 31 lifting it with respect to the conveyor belt 17 and thus lifting the product P contacted by the conveyor belt 17.

In the preferred embodiment of the invention, the fluid-operated lifter 33 is a pneumatic lifter based on the Venturi effect to create a depression.

Each gripping equipment 12 comprises a pressurized fluid distributor 34 in fluid connection with the pressurized fluid distributors 34 of the two adjacent gripping equipment 12.

At least one, preferably two pressurized fluid distributors 34 are in fluid connection with a pressurized fluid source 35.

In the preferred embodiment of the invention, the pressurized fluid source 35 is a compressed air source.

In order to connect the pressurized fluid distributors 34 together, each pressurized fluid distributor 34 comprises an entry 36 and an exit 37 in fluid connection. The exit 37 of a pressurized fluid distributor 34 is connected to the entry 36 of the pressurized fluid distributor 34 of the adjacent gripping equipment 12.

Figure 7:
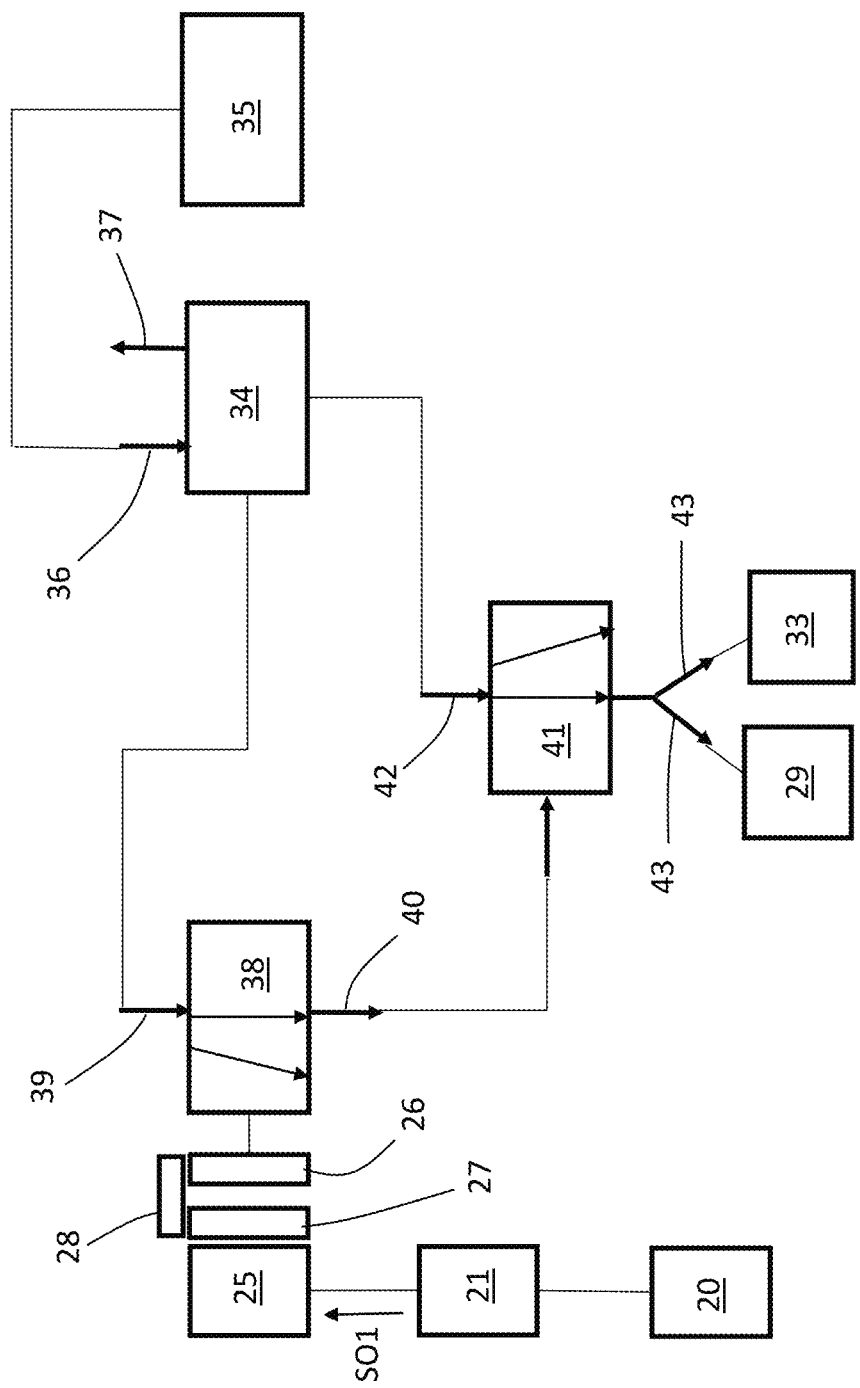
FIGS. 7 and 8 represent an operating diagram of some details of the device of FIG. 1 in two different operating configurations.

In order to activate the fluid-operated piston 29 and the fluid-operated lifter 33 when a gripping equipment must be operated to correctly orient a product P, the first switching device 22 comprises an electromagnet 25 mounted on the frame 11 and which is activated to generate a magnetic field when the processor 21 generates the first orientation signal SO1 (as schematized in FIG. 7).

The first switching device 22 further comprises a mechanical pusher 26 mounted on each gripping equipment 12 kinematically connected to a ferromagnetic body 27 also mounted on each gripping equipment 12.

The ferromagnetic body 27 can assume an active position and an inactive position. In the active position, the ferromagnetic body 27 allows a movement of the mechanical pusher 26 into an activation position. In the inactive position, the ferromagnetic body 27 prevents the activation of the mechanical pusher 26 by holding it in an inactive position.

An operating lever 28 is interposed between the ferromagnetic body 27 and the mechanical pusher 26. The operating lever 28 drives the mechanical pusher 26 in the activation position when the ferromagnetic body 27 assumes the active position. The operating lever 28 allows the mechanical pusher 26 to reach the inactive position when the ferromagnetic body 27 assumes the inactive position. Each ferromagnetic body 27 is configured to transit in front of the electromagnet 25. When a ferromagnetic body 27 transits in front of the electromagnet 25, the ferromagnetic body 27 is always in the inactive position (and hence the mechanical pusher 26 is in the inactive position). When the electromagnet 25 is activated, the ferromagnetic body 27 is attracted by the electromagnet 25 and moves into the active position. This causes a movement of the operating lever 28 which drives the mechanical pusher 26 in the activation position. When the electromagnet 25 is not activated, the ferromagnetic body 27 is not attracted by the electromagnet 25 and remains in the inactive position.

Figure 8:
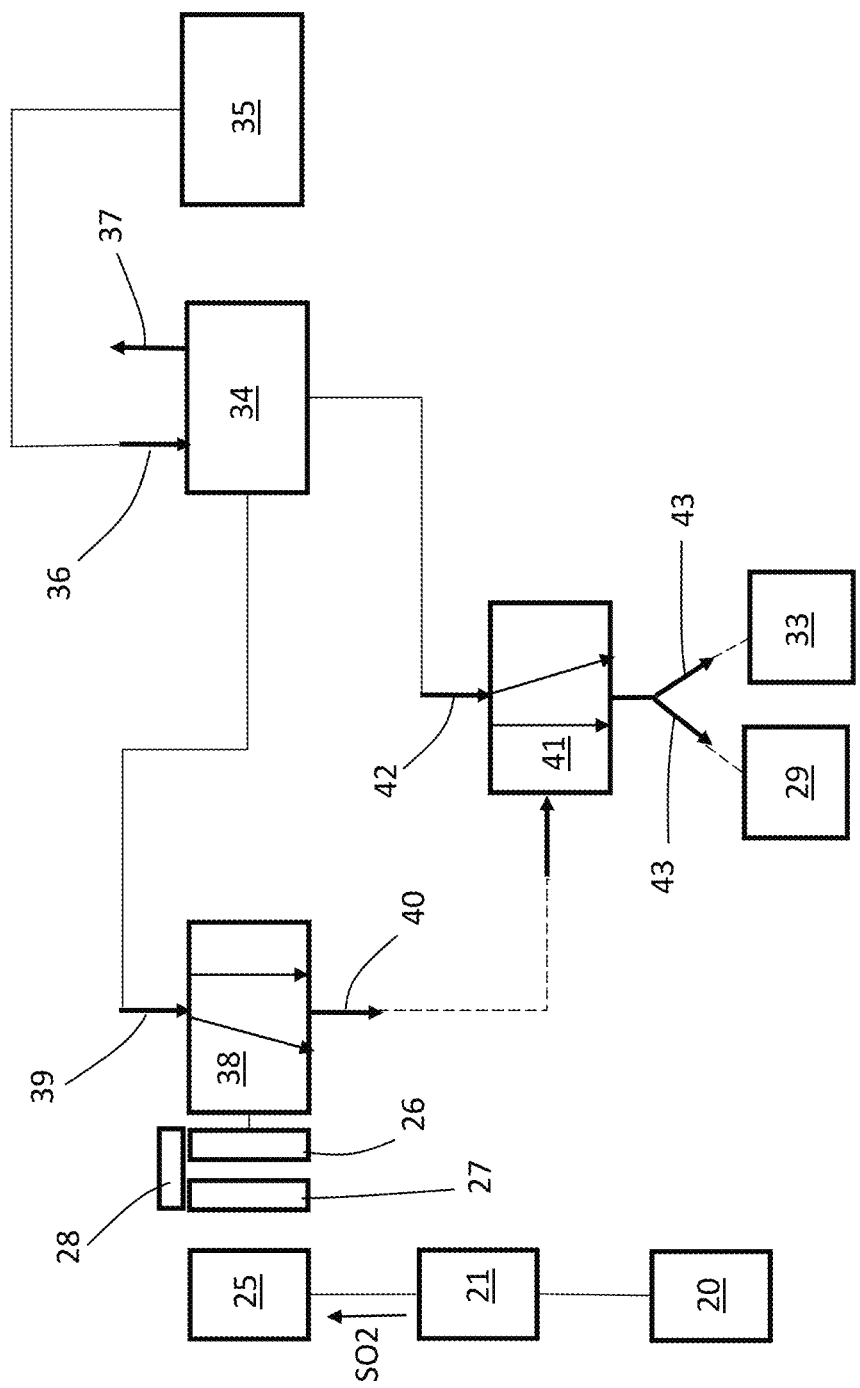

The first switching device 22 further comprises a pilot valve 38 placed on each gripping equipment 12 and switchable between an open position (schematically illustrated in FIG. 7) and a closed position (schematically illustrated in FIG. 8).

The mechanical pusher 26 is configured to switch the pilot valve 38 between the closed position and the open position.

When the mechanical pusher 26 is in the activation position, the mechanical pusher 26 switches the pilot valve 38 to the open position.

The pilot valve 38 comprises an entry 39 permanently in fluid communication with the pressurized fluid distributor 34 and an exit 40 which is placed in fluid communication with the entry 39 when the pilot valve 38 is in the open position.

The first switching device 22 comprises an actuation valve 41 placed on each gripping equipment 12 and switchable between an open position (schematically illustrated in FIG. 7) and a closed position (schematically illustrated in FIG. 8).

The pilot valve 38 is configured to switch the actuation valve 41 between the closed position and the open position.

When the pilot valve 38 is in the open condition, the pilot valve sends pressurized fluid to the actuation valve 41 switching it to the open position.

When the pilot valve 38 is in the closed condition, the pilot valve does not send pressurized fluid to the actuation valve 41 switching it to the closed position.

The actuation valve 41 comprises an entry 42 permanently in fluid communication with the pressurized fluid distributor 34 and an exit 43 which is placed in fluid communication with the entry 42 when the actuation valve 41 is in the open position.

The exit 43 of the actuation valve 41 is in fluid communication with the fluid-operated piston 29 and with the fluid-operated lifter 33, as schematized in FIG. 7.

When the actuation valve 41 is in the open position, the fluid-operated piston 29 and the fluid-operated lifter 33 are activated.

The gripping head 24 is rotatable about the rotation axis X regardless of the orientation of the product P placed below the gripping equipment 12.

The gripping head 24 rotates in a first angular direction during the movement of the respective gripping equipment 12 along a gripping portion 15a of the active branch 15 of the transport track 13.

The gripping portion 15a of the active branch 15 of the transport track 13 is comprised between the point, along the active branch 15 of the transport track 13, in which the gripping heads 24 contact the product P to be correctly oriented and the point in which the gripping heads 24 release the oriented product P.

The gripping portion 15a of the active branch 15 of the transport track 13 substantially coincides, in the preferred embodiment of the invention, with the entire active branch 15 of the transport track 13.

In fact, the active branch 15 of the transport track 13 starts at the point where the support body 23 starts the stroke to reach the approached condition from the distanced condition and ends at the point where the support body 23 starts the stroke to reach the distanced condition from the approached condition.

Furthermore, the stroke of the support body 23 to reach the approached condition from the distanced condition is very short and is travelled by the support body 23 at a much higher speed than the transport speed of the conveyor belt 17.

Each gripping head 24 rotates in the first angular direction regardless of the actual movement of the respective support body 23 from the distanced condition to the approached condition.

In other words, the gripping heads 24 always rotate in the first angular direction even when the product P is correctly oriented. In this case, this rotation has no effect on the product P as the support body 23 does not lower the gripping head 24 on the product P.

The rotation of the gripping head 24 in the first angular direction takes place according to a first angular amount which, in the case where the products P are placed on the conveyor belt 17 oriented with a lower portion preceding an upper portion or with an upper portion preceding a lower portion, is of 180°.

In the return branch 16 of the transport track 13, all the gripping heads 24 rotate about the rotation axis X by a same second angular amount and in a same second angular direction.

The second angular amount is equal to the first angular amount and the second angular direction is opposite to the first angular direction.

The rotation of each gripping head 24 is actuated by providing a cam 44 (illustrated in FIG. 2) extending along the active branch 15 of the transport path 13. Such a cam 44 is, in the preferred embodiment of the invention, a groove.

Each gripping equipment 12 comprises a follower 45 engaged in the cam 44. The follower 45, illustrated in FIGS. 2 and 4, is a pawl inserted in the groove that makes the cam 44.

Figure 4:
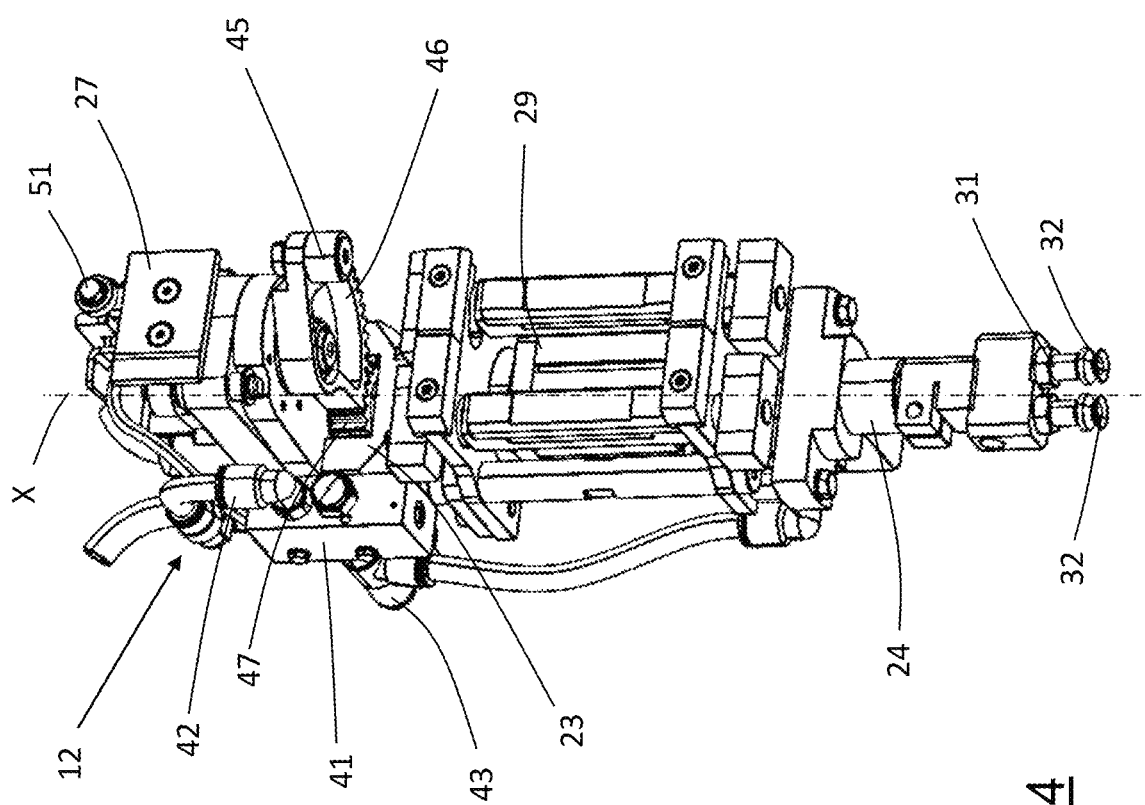
FIG. 4 is a schematic perspective view of a gripping equipment of the device of FIG. 2.

The follower 45 is connected to a toothed rack 46, in the form of a circular segment, provided on each gripping equipment 12 and illustrated in FIG. 4.

The travel of the follower 45 in the cam 44 results, as a function of the path defined by the cam 44, in a rotation of the toothed rack 46.

The toothed rack 46 is meshed on a gear wheel 47 keyed to the support body 23 of each gripping equipment 12 (FIG. 4). The gear wheel 47 is keyed to the support body 23 to rotate about an axis coincident with the rotation axis X of the gripping head 24. The rotation of the rack 46 results in a rotation of the gear wheel 47 and thus of the support body 23 which, being constrained in rotation to the gripping head 34, results in a rotation of the gripping head 24.

The cam 44 is configured to put the rack 46 in rotation as the gripping equipment transits in front of the electromagnet 25.

There is also provided a further cam 48 which is continuously joined to the cam 44 and which extends along the return section 16 of the transport track 13 and which has the function of putting the rack 46 in rotation in the second angular direction so as to rotate the gripping head 24 by the second angular amount.

There is provided a second switching device 49 at the end of the active branch 15 of the transport track 13.

The second switching device 49 has the function of switching the support bodies 23 from the approached condition to the distanced condition.

The second switching device 49 acts only on the support bodies 23 that have been brought into the approached condition and does not act on the support bodies 23 that have not been brought into the approached condition. The second switching device 49 is placed along the transport track 13 downstream of the electromagnet 25.

Figure 5:
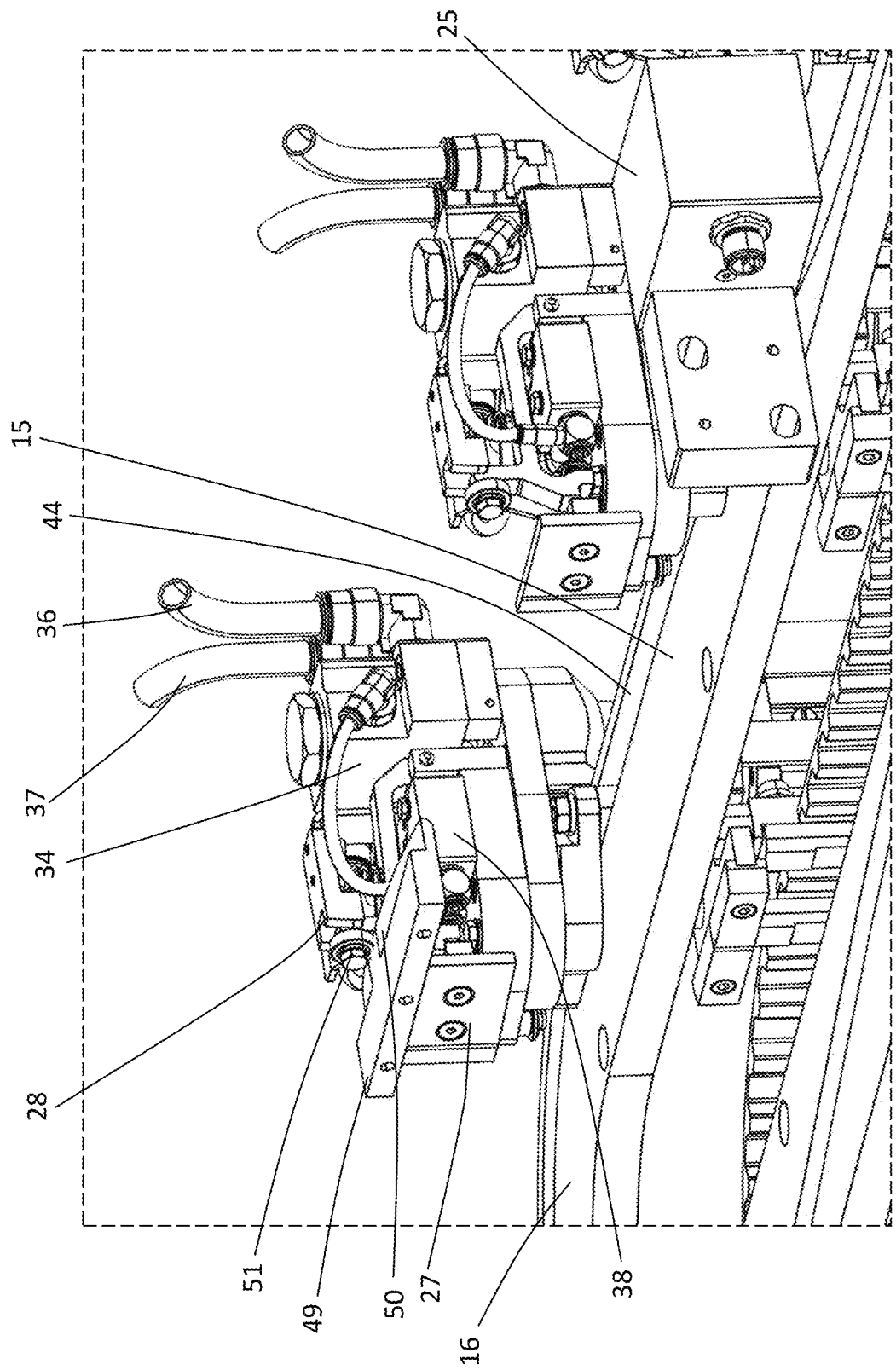
FIG. 5 is a schematic perspective view of other details of the orientation device of FIG. 1.

As shown in FIG. 5, the second switching device 49 comprises a chute 50 acting on the operating lever 28. In particular, the chute acts on a slider 51 of the operating lever 28 moving the operating lever 28 in the opposite direction to the movement of the operating lever 28 caused by the ferromagnetic body 27. The movement of the operating lever 28 caused by the chute 50 drives the mechanical pusher 26 from the activation position to the inactive position.

In the inactive position, the mechanical pusher 26 switches the pilot valve 38 to the closed position (as schematically illustrated in FIG. 8), causing the actuation valve 41 to switch to the closed position and the interruption of the supply of pressurized fluid to the fluid-operated piston 29 and to the fluid-operated lifter 33. The interruption of the supply of pressurized fluid to the fluid-operated lifter 33 results in the cessation of the suction action of the gripping handpiece 31, its consequent translation with respect to the gripping head 24 towards the conveyor belt 17 and the release of the product P (previously lifted) on the conveyor belt 17.

The interruption of the supply of pressurized fluid to the fluid-operated piston 29 causes the support body 23 to switch from the approached condition to the distanced condition due to the action exerted by the return spring 30.

The mechanical pusher 26 remains in the inactive position as long as it is switched back to the activation position by the first switching device 22.

In use, the products P are fed to the conveyor belt 17 arranged between them according to a single row and spaced apart by the product distance D1 or by multiples of the latter.

The products P are fed onto the conveyor belt 17 at the groups of suction holes 18.

The conveyor belt 17 advances at the constant transport speed and carries, one after the other, the products P at the orientation detector 19. The video camera or camera 20 of the orientation detector 19 acquires an image of the product P and the processor 21 determines whether the orientation of the product P is not correct.

In the case where the orientation of the product P is not correct, the processor 21 generates the first orientation signal SO1 and sends it to the first switching device 22.

Above the conveyor belt 17, the gripping equipment 12 move along the transport track 13 at the same speed as the transport speed of the conveyor belt 17. Each gripping equipment 12 is placed substantially on the vertical of a respective group of suction holes 18.

When the first switching device 22 receives a first orientation signal SO1, the electromagnet 25 is activated which attracts the ferromagnetic body 27 of the corresponding gripping equipment 12. The ferromagnetic body drives the operating lever 28 which switches the mechanical pusher 26 into the activation position. This causes the pilot valve 38 to switch to the open position which brings the actuation valve 41 into the open position.

Pressurized fluid is sent to the fluid-operated piston 29 which causes the support body 23 to switch from the distanced position to the approached position to the conveyor belt 17. At the same time, the fluid-operated lifter 33 is sent pressurized fluid that causes a lowering (with respect to the gripping head 24) of the gripping handpiece 31 that lies on the product P holding it due to the depression inside the gripping handpiece 31. This depression creates, as soon as the gripping handpiece 31 adheres to the product P, a lifting of the gripping handpiece with respect to the gripping head 24.

During the performance of these actions, the gripping equipment 12 is slightly advanced along the transport track 13 and the cam 44, engaged by the relative follower 45 of the gripping equipment 12, puts the rack 46 in rotation which, through the gear wheel 47, puts the gripping head 24 in rotation in the first angular direction.

The product P is thus rotated in the first angular direction and by the first angular amount while the gripping equipment 12 travels along the active branch 15 of the transport track 13.

When the gripping equipment 12 reaches the second switching device 49, the rotation of the gripping head 24 is completed and the product P is correctly oriented.

The chute 51 of the second switching device 49 lifts the slider 51 of the operating lever 28 which switches the operating lever 28 which places the mechanical pusher 26 in the inactive position bringing the pilot valve 38 and the actuation valve 41 into the closed position.

The supply of pressurised fluid to the fluid-operated lifter 33 is then interrupted, which causes the suction action of the gripping handpiece 31 to cease. This causes the translation of the gripping handpiece 31 with respect to the gripping head 24 towards the conveyor belt 17 and the release of the product P on the conveyor belt 17 on the same group of suction holes 18 from which it was taken.

The supply of pressurized fluid to the fluid-operated piston 29 is also interrupted, which causes the support body 23 to switch from the approached condition to the distanced condition due to the action exerted by the return spring 30.

When the orientation detector 19 determines that the orientation of a product P is correct, the electromagnet 25 is not activated and the gripping equipment 12 travels along the active branch of the transport track 13 without switching the support body 23 to the approached position and without activating the depression in the gripping handpiece 31.

Also in this case, the cam 44 engaged by the relative follower 45 of the gripping equipment 12 puts the rack 46 in rotation which, through the gear wheel 47, puts the gripping head 24 in rotation in the first angular direction. This rotation takes place without the gripping handpiece 31 acting on the product P.

In both cases, when the gripping equipment 12 travels along the return branch 16 of the transport path 13, the further cam 48 engaged by the relative follower 45 of the gripping equipment 12 puts the rack 46 in rotation which, through the gear wheel 47, puts the gripping head 24 in rotation in the second angular direction.

At the end of the return branch 16 of the transport path 13, the gripping equipment 12 shows up again on the active branch 15 of the transport path 13 and the actions described above are repeated.

The invention claimed is:

1. An orientation device for orientating loose products for a packaging manufacturing line, comprising:
    a conveyor belt movable at a transport speed along an advancement direction between an entry station and an exit station;
    a plurality of gripping equipment wherein each gripping equipment comprises a support body and a gripping head mechanically connected to the support body;
    a transport track to which the support bodies of the plurality of gripping equipment are connected, wherein the transport track is supported by a frame and wherein the transport track comprises an active branch extending parallel to the conveyor belt, spaced from the conveyor belt and completely contained between the entry station and the exit station of the conveyor belt;
    wherein each gripping head is rotatable about a rotation axis perpendicular to the conveyor belt and is configured to pick up and hold a product transported by the conveyor belt;
    wherein each support body is movable parallel to the rotation axis of the respective gripping head between an approached condition to the conveyor belt and a distanced condition from the conveyor belt; and
    wherein each support body moves along the active branch of the transport track with a speed equal to the transport speed of the conveyor belt;
    the orientation device further comprising an orientation detector operatively active on the conveyor belt configured to generate at least a first orientation signal representative of an incorrect orientation of a product transported on the conveyor belt.

2. The device according to claim 1, comprising a first switching device configured to switch the support body of a respective gripping equipment from the distanced condition to the approached condition to the conveyor belt only if the orientation detector generates said first orientation signal.

3. The device according to claim 2, wherein each support body of the gripping equipment comprises a fluid-operated piston for moving between the distanced condition and the approached condition, and wherein each gripping head of the gripping equipment comprises a gripping handpiece configured to contact and hold a product transported by the conveyor belt; said gripping head further comprising a fluid-operated lifter for said gripping handpiece configured to distance said gripping handpiece from said conveyor belt.

4. The device according to claim 3, wherein said first switching device comprises an actuation valve switchable between an open position in which it puts a pressurized fluid source in fluid communication with said fluid-operated piston and with said fluid-operated lifter and a closed position in which it interrupts a fluid communication between said pressurized fluid source, said fluid-operated piston and said fluid-operated lifter.

5. The device according to claim 2, comprising a second switching device configured to switch the support body of a respective gripping equipment from the approached condition to the distanced condition, said second switching device being active only on the support bodies placed in the approached condition by the first switching device.

6. The device according to claim 4, wherein said first switching device comprises a mechanical pusher for switching, at least indirectly, said actuation valve between the closed position and the open position and between the open position and the closed position.

7. The device according to claim 6, wherein said first switching device comprises an electromagnet for activating said mechanical pusher; said electromagnet being activated only when said orientation detector generates said first orientation signal.

8. The device according to claim 1, comprising a cam connected to said active branch of the transport track and wherein each gripping equipment comprises a follower engaged on said cam; said follower imposing a rotation about the rotation axis of the gripping head of the respective gripping equipment.

9. The device according to claim 8, wherein each gripping equipment comprises a gear wheel keyed to the support body and engaged by a rack controlled in rotation by said follower, each gripping head being integral in rotation to the respective support body.

10. The device according to claim 1, comprising a pressurized fluid source; all of the gripping equipment being fluidly connected to each other in series and at least one gripping equipment being connected to said pressurized fluid source.

11. A method for orientating loose products in a packaging manufacturing line, comprising:
feeding products arranged in a single row to a conveyor belt;
advancing the conveyor belt at a transport speed;
arranging a plurality of gripping equipment, lowering a gripping equipment onto a product transported by the conveyor belt only if said product is not correctly oriented and holding said product with a gripping head of the gripping equipment;
rotating the gripping head while the product is held by the gripping head and while the gripping equipment moves parallel to the conveyor belt and at a same speed as the conveyor belt;
releasing the rotated product onto the conveyor belt.

12. The method according to claim 11, wherein lowering the gripping equipment on the product transported by the conveyor belt is preceded by detecting the orientation of the product transported to determine whether the product transported is not correctly oriented, and wherein lowering the gripping equipment on the product transported by the conveyor belt is only actuated when the product transported is not correctly oriented.

13. The method according to claim 11, wherein releasing the rotated product on the conveyor belt comprises releasing the product on a same portion of the conveyor belt from which it was taken.

14. The method according to claim 11, wherein feeding products to the conveyor belt arranged in the single row comprises feeding products to the conveyor belt spaced apart by equal distances or integer multiples of a predetermined product distance.

* * * * *